(12) United States Patent
Asano

(10) Patent No.: US 9,152,024 B2
(45) Date of Patent: Oct. 6, 2015

(54) VIDEO DISPLAY DEVICE AND COOLING SYSTEM

(71) Applicant: Sony Corporation, Tokyo (JP)

(72) Inventor: Yoshiro Asano, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 220 days.

(21) Appl. No.: 13/894,644

(22) Filed: May 15, 2013

(65) Prior Publication Data
US 2013/0314600 A1    Nov. 28, 2013

(30) Foreign Application Priority Data

May 22, 2012    (JP) ................................ 2012-116378

(51) Int. Cl.
G02B 21/16    (2006.01)
G03B 21/16    (2006.01)
H04N 9/31    (2006.01)
G02F 1/1333    (2006.01)

(52) U.S. Cl.
CPC .......... *G03B 21/16* (2013.01); *G02F 1/133385* (2013.01); *H04N 9/3105* (2013.01); *H04N 9/3144* (2013.01)

(58) Field of Classification Search
CPC .............. G03B 21/16; G02F 1/133385; G02F 1/133382
USPC ........ 353/52, 57, 54, 60, 61; 165/136, 104.33
See application file for complete search history.

(56) References Cited

U.S. PATENT DOCUMENTS

| | | | |
|---|---|---|---|
| 7,841,721 B2 * | 11/2010 | Momose et al. | 353/54 |
| 2005/0117077 A1 * | 6/2005 | Utsunomiya | 349/5 |
| 2005/0168703 A1 * | 8/2005 | Fujimori et al. | 353/52 |
| 2005/0195460 A1 * | 9/2005 | Fujimori et al. | 359/237 |
| 2005/0220156 A1 * | 10/2005 | Kitabayashi | 372/35 |
| 2011/0194578 A1 * | 8/2011 | Hirose et al. | 372/36 |

* cited by examiner

*Primary Examiner* — William C Dowling
*Assistant Examiner* — Magda Cruz
(74) *Attorney, Agent, or Firm* — Frommer Lawrence & Haug LLP; William S. Frommer

(57) ABSTRACT

A video display device includes: a video processing unit generating and displaying video signals; and a cooling mechanism unit cooling a component to be cooled in the video processing unit, wherein the cooling mechanism unit includes a heat-receiving plate installed at the component to be cooled to receive heat generated at the component to be cooled, a heat conduction member transmitting heat of the heat-receiving plate, a cooler cooling heat transmitted by the heat conduction member by a cooling liquid, and a circulating thermal regulator circulating the cooling liquid with respect to the cooler while managing a liquid temperature of the cooling liquid so as to be a constant temperature.

6 Claims, 5 Drawing Sheets

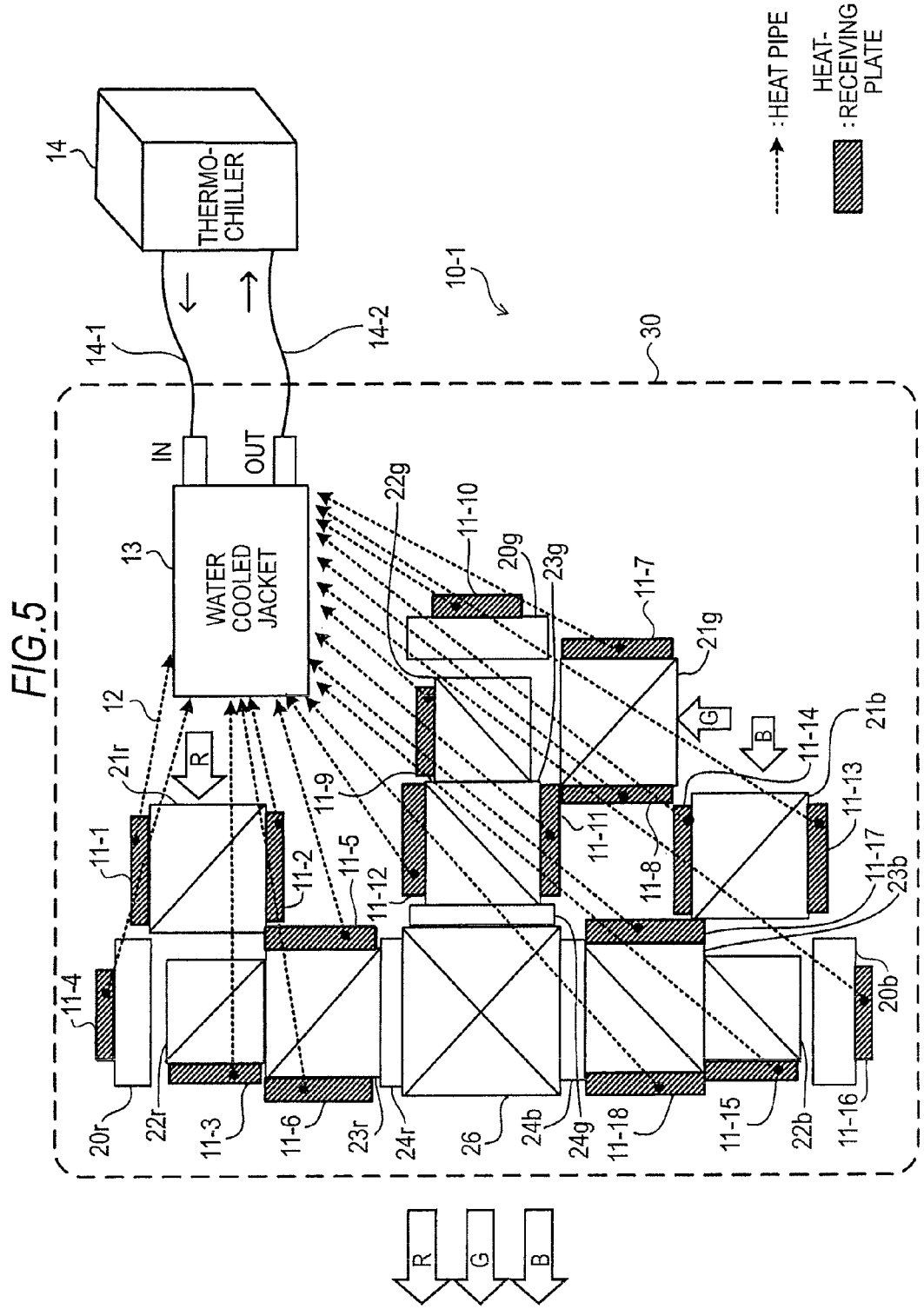

VIDEO DISPLAY DEVICE AND COOLING SYSTEM

FIELD

The present disclosure relates to a video display device performing video display and a cooling system performing cooling.

BACKGROUND

A projector device is a device for displaying videos by irradiating a liquid crystal panel with light from a light source and projecting light transmitted through the liquid crystal panel on a screen by a projection lens.

In such projector device, various optical components be a high temperature due to heat of the light source. Accordingly, cooling is performed, for example, by taking outside air into a device casing by using an air cooling fan.

In the method of taking outside air into the casing by using the air cooling fan to perform cooling, dust is also taken at the same time as taking outside air and the dust may adhere to various optical components.

When the dust is taken in, the dust blocks transmitting light of the liquid crystal panel or makes the light reflect diffusely which may cause stains or blots on images. Accordingly, a dustproof filter is provided on an intake side of the air cooling fan to remove dust.

A cooling device receiving heat from a cooling medium flowing through a duct by a radiator part including a heat-receiving plate and a thermoelement is proposed as a related-art technology.

An example of the related art includes JP-A-2006-343498.

SUMMARY

As described above, air obtained by removing dust by the filter is generally used as the air for cooling the optical components of the projector device.

However, as it is difficult to completely remove extremely small dust such as vaporized oil and cigarette smoke, dust remaining after the removal by the filter adheres to optical components.

Accordingly, it is necessary to periodically clean the optical components. Periodic replacement/cleaning of the filter is also necessary as the filter is gradually clogged.

Furthermore, the force of taking air by the air cooling fan becomes weak and the cooling force is reduced as the filter is clogged. Then, the temperature of optical components is increased, therefore, it becomes difficult to maintain stable cooling. Additionally, as the cooling by the air cooling fan is affected by an outside air temperature, it is difficult to maintain stable cooling also due to this reason.

As described above, in the related-art cooling method using the cooling fan and the dustproof filter, there are problems that man hours of maintenance/inspection are increased and thus it is further difficult to maintain stable cooling.

In view of the above, it is desirable to provide a video display device and a cooling system capable of reducing the man hours of maintenance/inspection and performing stable cooling.

An embodiment of the present disclosure provides a video display device. The video display device includes a video processing unit generating and displaying video signals and a cooling mechanism unit cooling components to be cooled in the video processing unit. The cooling mechanism unit has a heat-receiving plate, a heat conduction member, a cooler, and a circulating thermal regulator. The heat-receiving plate is installed at the components to be cooled to receive heat generated at the components to be cooled. The heat conduction member transmits heat of the heat-receiving plate. The cooler cools heat transmitted by the heat conduction member by a cooling liquid. The circulating thermal regulator circulates the cooling liquid with respect to the cooler while managing a liquid temperature of the cooling liquid so as to be a constant temperature.

With the configuration described above, it is possible to reduce the man hours of maintenance/inspection as well as to perform stable cooling.

BRIEF DESCRIPTION OF THE DRAWINGS

FIG. 5 is a view showing a cooling mechanism of the optical block.

DESCRIPTION OF EMBODIMENT

Figure 1:
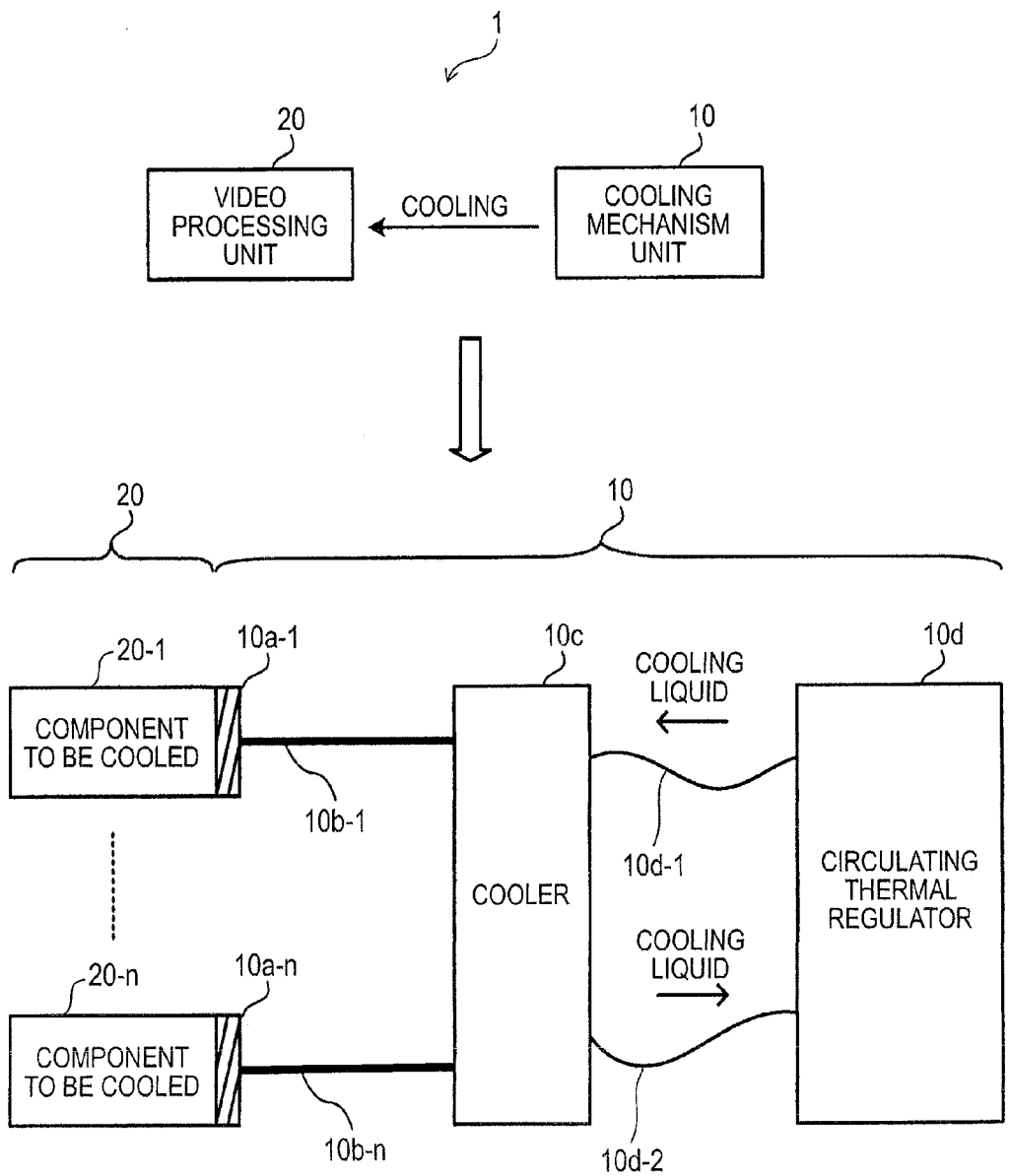
FIG. 1 is a diagram showing a structure example of a video display device.

Hereinafter, an embodiment of the present disclosure will be explained with reference to the drawings. FIG. 1 is a diagram showing a structure example of a video display device. The video display device 1 has a video processing unit 20 generating and displaying video signals and a cooling mechanism unit 10 cooling components to be cooled 20-1 to 20-n in the video processing unit 20. The video display device 1 corresponds to, for example, a projector device.

The cooling mechanism unit 10 includes heat-receiving plates 10a-1 to 10a-n, heat conduction members 10b-1 to 10b-n, a cooler 10c and a circulating thermal regulator 10d.

The heat-receiving plates 10a-1 to 10a-n are installed at the components to be cooled 20-1 to 20-n to receive heat generated in the components to be cooled 20-1 to 20-n. The heat conduction members 10b-1 to 10b-n connect the heat-receiving plates 10a-1 to 10a-n to the cooler 10c, transmitting heat of the heat-receiving plates 10a-1 to 10a-n to the cooler 10c.

The cooler 10c cools heat transmitted by the heat conduction members 10b-1 10b-n by a cooling liquid transmitted from the circulating thermal regulator 10d. The circulating thermal regulator 10d manages a liquid temperature of the cooling liquid so as to be a constant temperature, circulating the cooling liquid between the circulating thermal regulator 10d and the cooler 10c. The cooling liquid is transmitted to the cooler 10c through a duct 10d-1 and is returned to the circulating thermal regulator 10d through a duct 10d-2.

As described above, the video display device 1 has a structure in which the heat-receiving plates are installed at the components to be cooled and heat is transmitted to the cooler connected to the circulating thermal regulator through the heat conduction members to thereby cool the components to be cooled.

According to the above structure, as the outside air is not used for cooling, maintenance performed when using the related-art air cooling fan and the dustproof filter is not necessary, which can drastically reduce the man hours of maintenance/inspection. It is also possible to maintain stable cooling not affected by variation of the outside air temperature.

Figure 2:
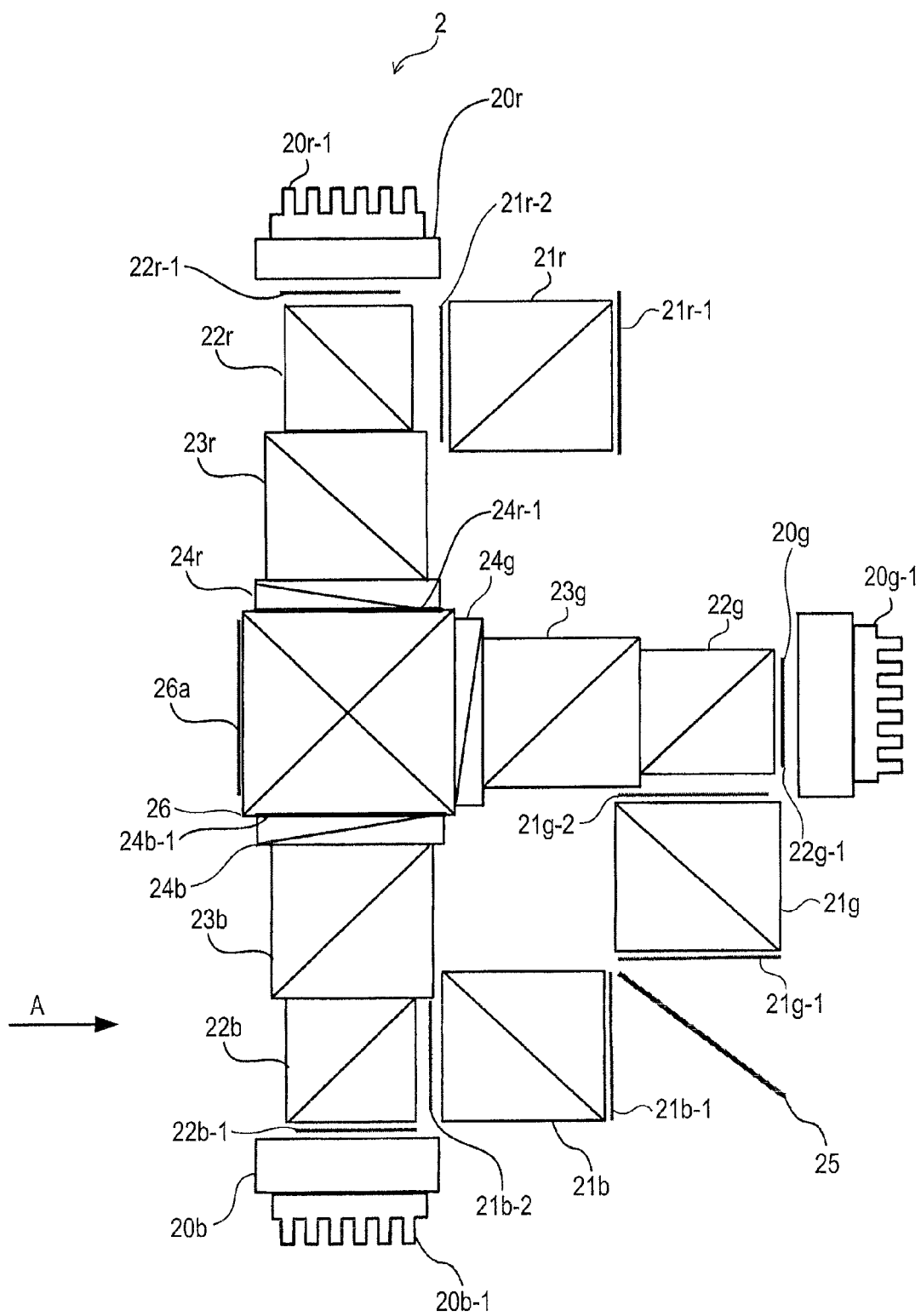
FIG. 2 is a diagram showing a structure example of an optical block.

Next, a structure of an optical block inside the video display device 1 will be explained. FIG. 2 is a diagram showing a structure example of the optical block. A LCOS (Liquid Crystal On Silicon) type optical block 2 is shown, which has a T-shaped prism structure.

The optical block 2 includes a red (R) reflective LCD (Liquid Crystal Display) 20r, a green (G) reflective LCD 20g and a blue (B) reflective LCD 20b as reflective liquid crystal panels.

Various prisms which are a pre-PBS (Polarization Beam Splitter) 21r, a main PBS 22r, a post PBS 23r and a buffer prism 24r are arranged around the red reflective LCD 20r.

A trimming filter 21r-1 is provided on an incident surface of the pre-PBS 21r and a ½ wavelength plate 21r-2 is provided on an emission surface of the pre-PBS 21r. Furthermore, a ¼ wavelength plate 22r-1 is provided between the main PBS 22r and the red reflective LCD 20r.

Various prisms which are a pre-PBS 21g, a main PBS 22g and a post PBS 23g and a buffer prism 24g are arranged around the green reflective LCD 20g.

A trimming filter 21g-1 is provided on an incident surface of the pre-PBS 21g and a ½ wavelength plate 21g-2 is provided on an emission surface of the pre-PBS 21g. Furthermore, a ¼ wavelength plate 22g-1 is provided between the main PBS 22g and the green reflective LCD 20g.

Various prisms which are a pre-PBS 21b, a main PBS 22b and a post PBS 23b and a buffer prism 24b are arranged around the blue reflective LCD 20b.

A trimming filter 21b-1 is provided on an incident surface of the pre-PBS 21b and a ½ wavelength plate 21b-2 is provided on an emission surface of the pre-PBS 21b. Furthermore, a ¼ wavelength plate 22b-1 is provided between the main PBS 22b and the blue reflective LCD 20b.

Furthermore, a dichroic mirror 25 separating light into green light and blue light and a 4p prism 26 combining red light, green light and blue light after polarization conversion and emitting the combined light. A ½ wavelength plate 24r-1 is provided between the 4p prism 26 and the buffer prism 24r.

Moreover, a ½ wavelength plate 24b-1 is provided between the 4p prism 26 and the buffer prism 24b. A ¼ wavelength plate 26a is provided on an emission surface of the 4p prism 26.

Furthermore, heat sinks 20r-1, 20g-1 and 20b-1 are provided on the red reflective LCD 20r, the green reflective LCD 20g and the blue reflective LCD 20b.

One flat surface of the heat sink 20r-1 is bonded to the red reflective LCD 20r and comb-shaped fins for releasing heat are provided on the other surface. Similarly, one flat surface of the heat sink 20g-1 is bonded to the green reflective LCD 20g and comb-shaped fins are provided on the other surface. One flat surface of the heat sink 20b-1 is bonded to the blue reflective LCD 20b and comb-shaped fins are provided on the other surface. A material of the heat sinks 20r-1, 20g-1 and 20b-1 is, for example, copper or aluminum.

Figure 3:
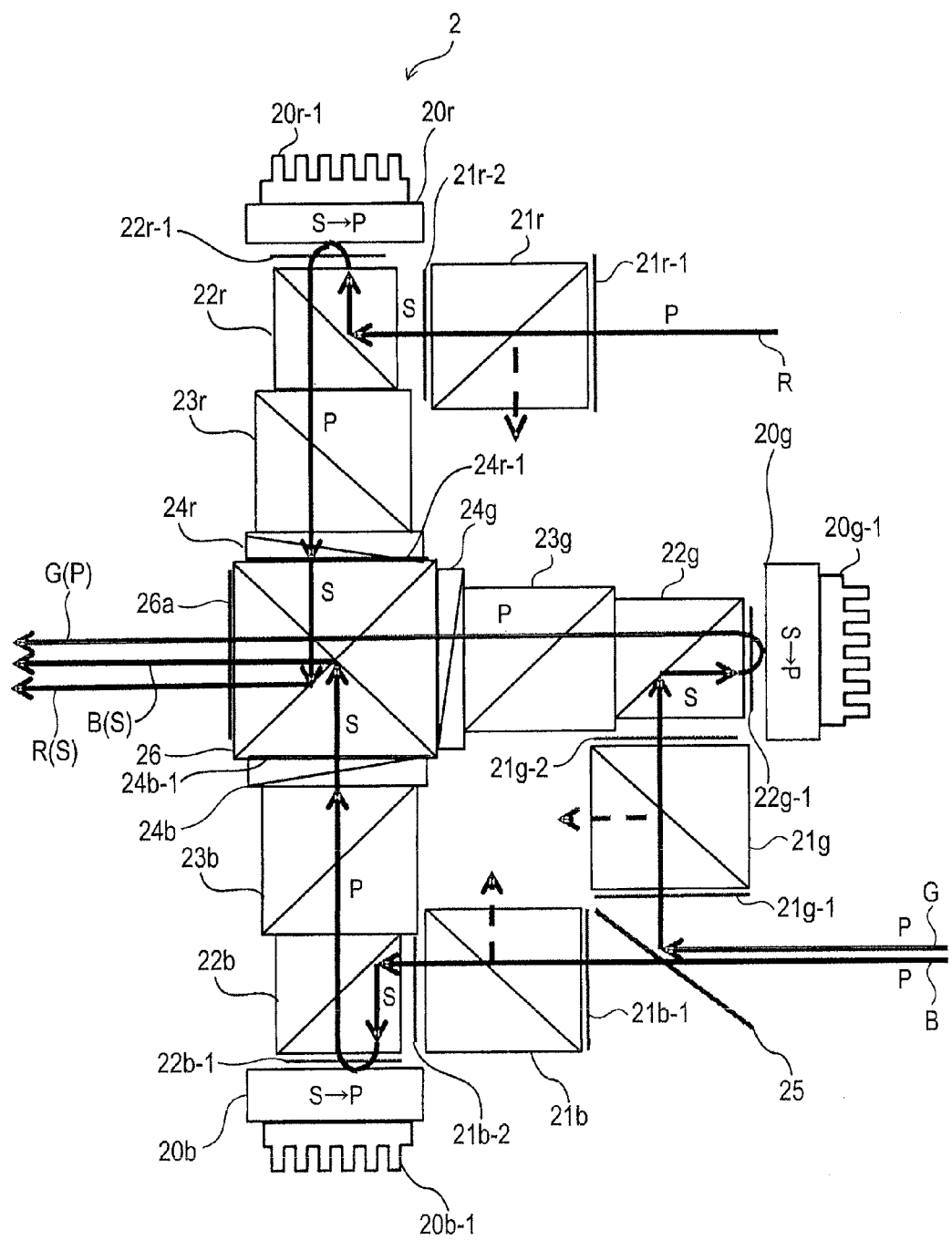
FIG. 3 is a view showing the operation of the optical block.

Next, the operation of the optical block 2 will be explained. FIG. 3 is a view showing the operation of the optical block. In the optical block 2, polarization is aligned by performing conversion from a P-wave to a S-wave or from a S-wave to a P-wave for increasing contrast.

Concerning an optical path of red light (R), first, red light is incident on the pre-PBS 21r. At this time, the trimming filter 21r-1 provided on the incident surface of the pre-PBS 21r eliminates light of unnecessary wavelength components from the incident red light.

The pre-PBS 21r reflects light other than P-wave light (a dot-line arrow in the drawing) and transmits only P-wave red light in red light after transmitted through the trimming filter 21r-1. The ½ wavelength plate 21r-2 provided on the emission surface of the pre-PBS 21r converts P-wave red light emitted from the pre-PBS 21r into S-wave red light to be incident on the main PBS 22r.

The main PBS 22r reflects S-wave red light toward the red reflective LCD 20r. The red reflective LCD 20r reflects S-wave red light after converting the light into P-wave red light.

At this time, the ¼ wavelength plate 22r-1 provided between the main PBS 22r and the red reflective LCD 20r transmits S-wave red light reflected on the main PBS 22r and makes the light incident on the red reflective LCD 20r. The ¼ wavelength plate 22r-1 transmits red light spatially modulated and converted into the P-wave in the red reflective LCD 20r and makes the light incident on the main PBS 22r again.

The P-wave red light generated in the red reflective LCD 20r is transmitted through the main PBS 22r, the post PBS 23r and the buffer prism 24r. Then, the ½ wavelength plate 24r-1 provided between 4p prism 26 and the buffer prism 24r converts the P-wave red light emitted from the buffer prism 24r into the S-wave and makes the light incident on the 4p prism 26.

The S-wave red light incident on the 4p prism 26 is reflected on the 4p prism 26, transmitted through the ¼ wavelength plate 26a and emitted toward a not-shown projection lens (R(S) in the drawing).

Concerning an optical path of green light (G), first, when green and blue mixed light is incident on the dichroic mirror 25, green light is reflected and blue light is transmitted, thereby separating the light into green light and blue light.

The reflected green light is incident on the pre-PBS 21g. At this time, the trimming filter 21g-1 provided on the incident surface of the pre-PBS 21g eliminates light of unnecessary wavelength components from the incident green light.

The pre-PBS 21g reflects light other than P-wave light (a dot-line arrow in the drawing) and transmits only P-wave green light in green light after transmitted through the trimming filter 21g-1. The ½ wavelength plate 21g-2 provided on the emission surface of the pre-PBS 21g converts P-wave green light emitted from the pre-PBS 21g into S-wave green light to be incident on the main PBS 22g.

The main PBS 22g reflects S-wave green light toward the green reflective LCD 20g. The green reflective LCD 20g reflects S-wave green light after converting the light into P-wave green light.

At this time, the ¼ wavelength plate 22g-1 provided between the main PBS 22g and the green reflective LCD 20g transmits S-wave green light reflected on the main PBS 22g and makes the light incident on the green reflective LCD 20g. The ¼ wavelength plate 22g-1 transmits green light spatially modulated and converted into the P-wave in the green reflective LCD 20g and makes the light incident on the main PBS 22g again.

The P-wave green light generated in the green reflective LCD 20g is transmitted through the main PBS 22g, the post PBS 23g and the buffer prism 24g. Then, the P-wave green light emitted from the buffer prism 24g is incident on the 4p prism 26.

The P-wave green light incident on the 4p prism is transmitted through the 4p prism 26 and the ¼ wavelength plate 26a and emitted toward a not-shown projection lens (G(P) in the drawing).

Concerning an optical path of blue light (B), first, when green and blue mixed light is incident on the dichroic mirror 25, green light is reflected and blue light is transmitted, thereby separating the light into green light and blue light.

The transmitted blue light is incident on the pre-PBS 21b. At this time, the trimming filter 21b-1 provided on the incident surface of the pre-PBS 21*b* eliminates light of unnecessary wavelength components from the incident blue light.

The pre-PBS 21*b* reflects light other than P-wave light (a dot-line arrow in the drawing) and transmits only P-wave blue light in blue light after transmitted through the trimming filter 21*b*-1. The ½ wavelength plate 21*b*-2 provided on the emission surface of the pre-PBS 21*b* converts P-wave blue light emitted from the pre-PBS 21*b* into S-wave blue light to be incident on the main PBS 22*b*.

The main PBS 22*b* reflects S-wave blue light toward the blue reflective LCD 20*b*. The blue reflective LCD 20*b* reflects S-wave blue light after converting the light into P-wave blue light.

At this time, the ¼ wavelength plate 22*b*-1 provided between the main PBS 22*b* and the blue reflective LCD 20*b* transmits S-wave blue light reflected on the main PBS 22*b* and makes the light incident on the blue reflective LCD 20*b*. The ¼ wavelength plate 22*b*-1 transmits blue light spatially modulated and converted into the P-wave in the blue reflective LCD 20*b* and makes the light incident on the main PBS 22*b* again.

The P-wave blue light generated in the blue reflective LCD 20*b* is transmitted through the main PBS 22*b*, the post PBS 23*b* and the buffer prism 24*b*. Then, the ½ wavelength plate 24*b*-1 provided between the 4p prism 26 and the buffer prism 24*b* converts the P-wave blue light emitted from the buffer prism 24*b* into the S-wave and makes the light incident on the 4p prism 26.

The S-wave blue light incident on the 4p prism 26 is reflected on the 4p prism 26, transmitted through the ¼ wavelength plate 26*a* and emitted toward a not-shown projection lens (B(S) in the drawing).

Figure 4:
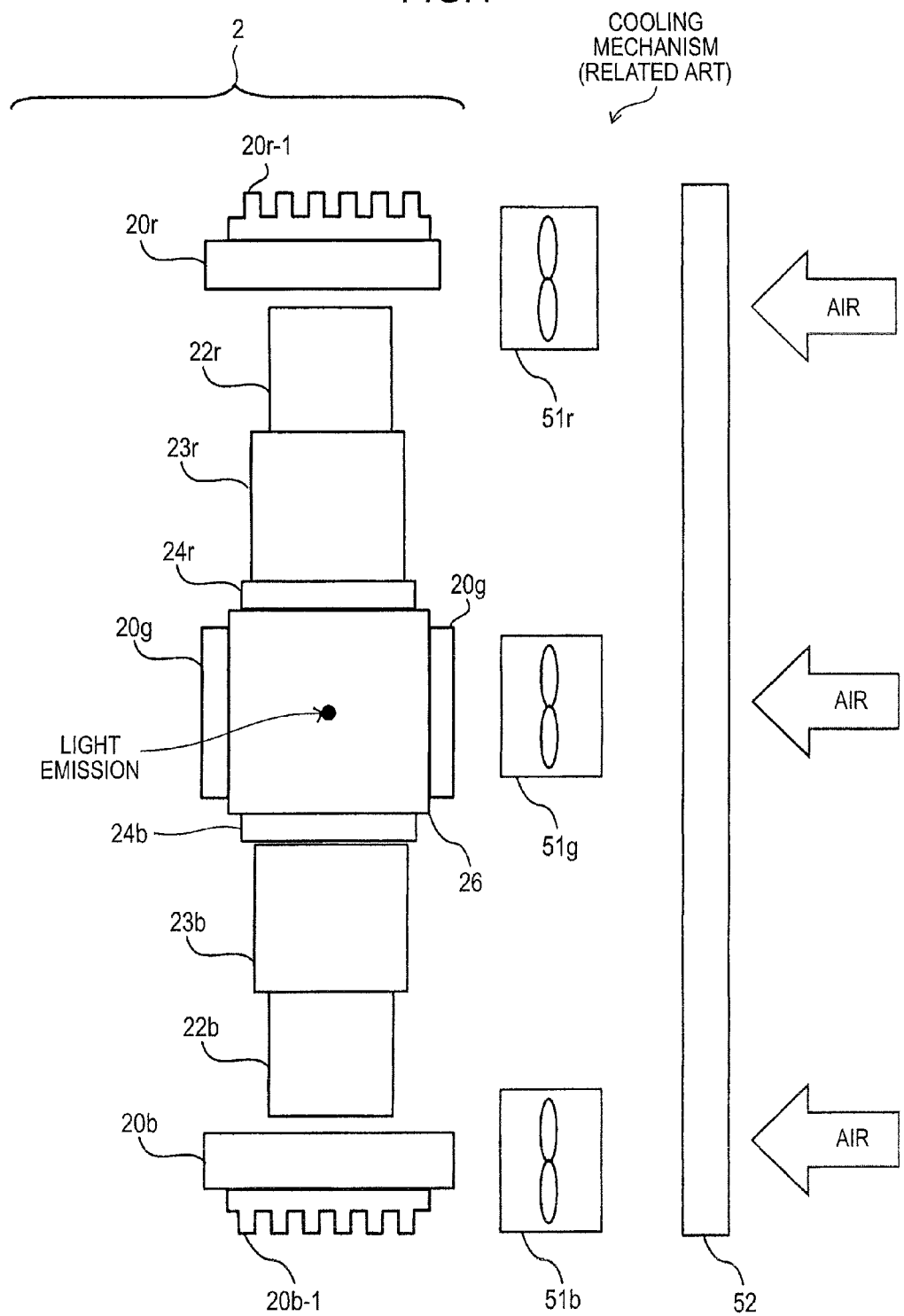
FIG. 4 is a view showing a cooling mechanism of the optical block.

Next, a related-art cooling mechanism with respect to the optical block 2 will be explained. FIG. 4 is a view showing a cooling mechanism of the optical block. The related-art cooling mechanism using air cooling fans 51*r*, 51*g* and 51*b* and a dustproof filter 52 in the projector device is shown.

FIG. 4 is the view seen from an A direction of FIG. 2, in which the air cooling fans 51*r*, 51*g* and 51*b* and the dustproof filter 52 are arranged in the vicinity of the optical filter 2 (Accordingly, emission light from the 4p prism 26 is emitted in the upper direction on the paper).

The air cooling fan 51*r* is arranged close to the red reflective LCD 20*g*, the air cooling fan 51*g* is arranged close to the green reflective LCD 20*g* and the air cooling fan 51*b* is arranged close to the blue reflective LCD 20*b*. The dust proof filter 52 is arranged on an intake side of respective air cooling fans 51*r*, 51*g* and 51*b*.

In the related-art cooling mechanism, cooling air generated from the air cooling fans 51*r*, 51*g* and 51*b* by using air after removing dust by the dustproof filter 52 is applied to given components (the heat sinks and so on) to perform cooling.

However, the above cooling mechanism has the following problems.

Periodic replacement/cleaning of the dustproof filter 52 will be necessary.

Extremely small dust such as vaporized oil and cigarette smoke is difficult to remove even when the dustproof filter 52 is used. Automation such as an automatic cleaning system or a filter winding system will not be a fundamental solution for removing the small dust.

Periodical cleaning of optical components will be necessary as luminance is reduced when the dust not removed by the dustproof filter 52 adheres to optical paths of respective optical components.

As the dustproof filter 52 is gradually clogged, the temperature of optical components is also increased, it is difficult to maintain stable cooling and the optical performance is reduced. Additionally, as the cooling by the air cooling fan is affected by the outside air temperature, it is difficult to maintain stable cooling.

As it is difficult to take countermeasures for noise in the air cooling filters 51*r*, 51*g* and 51*b* arranged in the vicinity of the dustproof filter 52, fan noise occurs.

In view of the above, it is desirable to provide the video display device and the cooling system capable of reducing the man hours of maintenance/inspection and performing stable cooling by providing a cooling mechanism not taking outside air.

Next, the cooling mechanism of the video display device 1 will be explained. FIG. 5 is a view showing the cooling mechanism of the optical block. The cooling mechanism (cooling system) according to an embodiment of the present disclosure in the optical block 2 in the video display device 1 is shown.

A heat-transport type cooling system 10-1 according to the embodiment of the present disclosure includes heat-receiving plates 11-1 to 11-18 (generically called the heat-receiving plates 11), heat pipes (heat conduction member) 12, a water cooled jacket (cooler) 13 and a thermo-chiller (circulating thermal regulator) 14.

The components to be cooled (the liquid crystal panels and PBSs), the heat-receiving plates 11-1 to 11-18, the heat pipes 12 and the water cooled jacket 13 are covered by a sealing wall (or sealing/insulating wall) 30. The sealing wall 30 is made of, for example, a transparent glass or a plastic material.

The heat-receiving plates 11 are directly bonded to the optical components, the liquid crystal panels and so on in which cooling are necessary by an adhesive and so on. Here, in general, an optical component having high transmittance and low light loss does not store heat easily, however, an optical component having low transmittance and high light loss easily stores heat.

As the optical components easily storing heat, for example, the PBS can be cited. As the PBS is formed by bonding plural prisms with a film, a film portion easily store heat. Additionally, the liquid crystal panel such as the reflective LCD also stores heat easily.

Accordingly, as respective components (components to be cooled) in the optical block 2 to which the heat-receiving plates 11 are bonded, the PBS and the reflective LCD can be cited. Hereinafter, bonding positions of the heat-receiving plates 11 in FIG. 5 will be shown (note that no heat sink is necessary).

As bonding positions in the red optical path, the heat-receiving plates 11-1 and 11-2 are bonded to the pre-PBS 21*r*. The heat-receiving plate 11-3 is bonded to the main PBS 22*r*. The heat-receiving plate 11-4 is bonded to the red reflective LCD 20*r*. The heat-receiving plates 11-5 and 11-6 are bonded to the post PBS 23*r*.

As bonding positions in the green optical path, the heat-receiving plates 11-7 and 11-8 are bonded to the pre-PBS 21*g*. The heat-receiving plate 11-9 is bonded to the main PBS 22*g*. The heat-receiving plate 11-10 is bonded to the green reflective LCD 20*g*. The heat-receiving plates 11-11 and 11-12 are bonded to the post PBS 23*g*.

Furthermore, as bonding positions in the blue optical path, the heat-receiving plates 11-13 and 11-14 are bonded to the pre-PBS 21*b*. The heat-receiving plate 11-15 is bonded to the main PBS 22*b*. The heat-receiving plate 11-16 is bonded to the blue reflective LCD 20*b*. The heat-receiving plates 11-17 and 11-18 are bonded to the post PBS 23*b*.

When the above heat-receiving plates 11-1 to 11-18 are bonded to respective optical components, they are bonded to positions in which optical paths are not shielded. Additionally, as the heat-receiving plates 11, for example, plates made of copper or aluminum are used as a material having high heat conductivity.

On the other hand, the heat pipes 12 are provided for respective heat-receiving plates 11-1 to 11-18. Therefore, eighteen heat pipes 12 are connected to the heat-receiving plates 11-1 to 11-18 respectively in the case of FIG. 5.

The heat-receiving plates 11-1 to 11-18 and the water cooled jacket 13 are connected to one another through the heat pipes 12. The heat pipes 12 are high-heat conduction members, transporting the heat received by the heat-receiving plates 11-1 to 11-18 to the water cooled jacket 13 (directions of dotted-line arrows in the drawing indicate directions in which heat is transported).

The water cooled jacket 13 includes an input unit IN and an output unit OUT of a circulation liquid (for example, water). The circulation liquid transmitted from the thermo-chiller 14 enters the inside of the water cooled jacket 13 through the input unit IN, and the heat transported through the heat pipes 12 is cooled. Additionally, the circulation liquid used for cooling is transmitted to the thermo-chiller 14 through the output unit OUT.

The thermo-chiller 14 circulates water as the cooling liquid while managing the liquid temperature to thereby maintain the temperature of cooling targets to be constant. The water for cooling is transmitted to the water cooled jacket 13 through a water flow duct 14-1 and is returned to the thermo-chiller 14 through a water flow duct 14-2. A circuit for circulating a cooling medium and water is included inside the thermo-chiller 14, and heat exchange is performed between the cooling medium and water through the circuit.

As described above, the heat-receiving plates 11 are directly bonded to the optical component to be cooled such as prisms, and the heat is transported to the water cooled jacket 13 connected to the thermo-chiller 14 through the heat pipes 12 to thereby cool the components to be cooled in the cooling mechanism (cooling system 10-1) in the video display device 1.

As the air cooling fan and the dustproof filter are not necessary due to the above structure, the maintenance performed at the time of air cooling is not necessary and fan noise does not occur. Additionally, as the temperature of the circulation liquid is maintained to be constant even when the outside air temperature varies, the temperature of optical components is maintained to be constant all the time and the optical performance can be secured. Not that, a projector set includes fans for cooling a power source and substrates and so on in addition to the fans for cooling optical components. However, as the fans for optical components are dominant with respect to fan noise in the entire set in many cases, the fan noise is drastically reduced when the fans for the optical components becomes unnecessary, which will contribute to the noise reduction.

Additionally, as the heat-transport type cooling system 10-1 has not a mechanism of taking outside air, the dustproof filter is not necessary as well as the optical block 2 can be formed in a sealing structure. Accordingly, foreign particles such as small dust do not enter, and thus, adhesion of foreign particles to the optical components can be remarkably suppressed.

Furthermore, in the heat-transport type cooling system 10-1, the heat-receiving plates are bonded to the components to be cooled to perform cooling, therefore, cooling can be performed by aiming exclusively at particular components to be cooled. Accordingly, it is possible to cool the heated positions more efficiently as compared with the cooling by using the air cooling fan.

The present disclosure can also apply the following structures.

(1) A video display device including
a video processing unit generating and displaying video signals, and
a cooling mechanism unit cooling components to be cooled in the video processing unit,
  in which the cooling mechanism unit has
  heat-receiving plates installed at the components to be cooled to receive heat generated at the components to be cooled,
  heat conduction members transmitting heat of the heat-receiving plates,
  a cooler cooling heat transmitted by the heat conduction members by a cooling liquid, and
  a circulating thermal regulator circulating the cooling liquid with respect to the cooler while managing a liquid temperature of the cooling liquid so as to be a constant temperature.

(2) The video display device described in the above (1),
  in which the heat-receiving plate is directly bonded to at least one of a liquid crystal panel and a prism of a polarizing beam splitter which are components to be cooled in the video processing unit.

(3) The video display device described in the above (1) or (2),
  in which the components to be cooled in the video processing unit, the heat-receiving plates, the heat conduction members and the cooler are formed in a sealing structure.

(4) A cooling system including
  heat-receiving plates installed at the components to be cooled to receive heat generated at the components to be cooled,
  heat conduction members transmitting heat of the heat-receiving plates,
  a cooler cooling heat transmitted by the heat conduction members by a cooling liquid, and
  a circulating thermal regulator circulating the cooling liquid with respect to the cooler while managing a liquid temperature of the cooling liquid so as to be a constant temperature.

(5) The cooling system described in the above (4),
  in which components to be cooled, the heat-receiving plates, the heat conduction members and the cooler are formed in a sealing structure.

The above embodiment can be variously modified within a scope not departing from the gist of the present disclosure.

Furthermore, in the above embodiment, various alternations and modifications may occur to those skilled in the art. The embodiment is not limited to the above accurate structures and application examples.

The present disclosure contains subject matter related to that disclosed in Japanese Priority Patent Application JP 2012-116378 filed in the Japan Patent Office on May 22, 2012, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A video display device comprising:
   a video processing unit, including a liquid crystal panel and a polarizing beam splitter, generating and displaying video signals; and
   a cooling mechanism unit cooling at least one of the liquid crystal panel and the polarizing beam splitter,
   wherein the cooling mechanism unit includes
      a heat-receiving plate directly bonded to at least one of the liquid crystal panel and the polarizing beam splitter to receive heat generated thereat,
      a heat conduction member transmitting heat of the heat-receiving plate,
      a cooler cooling heat transmitted by the heat conduction member by a cooling liquid, and
      a circulating thermal regulator circulating the cooling liquid with respect to the cooler while managing a liquid temperature of the cooling liquid so as to be a constant temperature.

2. The video display device according to claim 1,
   wherein the liquid crystal panel and the polarizing beam splitter, the heat-receiving plate, the heat conduction member and the cooler are formed in a sealing structure.

3. The video display device according to claim 2, wherein the circulating thermal regulator is formed outside the sealing structure.

4. A cooling system comprising:
   a heat-receiving plate directly bonded to a component to be cooled to receive heat generated at the component to be cooled;
   a heat conduction member transmitting heat of the heat-receiving plate;
   a cooler cooling heat transmitted by the heat conduction member by a cooling liquid; and
   a circulating thermal regulator circulating the cooling liquid with respect to the cooler while managing a liquid temperature of the cooling liquid so as to be a constant temperature.

5. The cooling system according to claim 4,
   wherein the component to be cooled, the heat-receiving plate, the heat conduction member and the cooler are formed in a sealing structure.

6. The cooling system according to claim 5, wherein the circulating thermal regulator is formed outside the sealing structure.

* * * * *